US011359056B2

(12) United States Patent
Knott et al.

(10) Patent No.: US 11,359,056 B2
(45) Date of Patent: *Jun. 14, 2022

(54) LINEAR POLYDIMETHYLSILOXANE-POLYOXYALKYLENE BLOCK COPOLYMERS OF THE STRUCTURE TYPE ABA

(71) Applicant: Evonik Operations GmbH, Essen (DE)

(72) Inventors: Wilfried Knott, Essen (DE); Horst Dudzik, Essen (DE); Frauke Henning, Essen (DE)

(73) Assignee: Evonik Operations GmbH, Essen (DE)

( * ) Notice: Subject to any disclaimer, the term of this patent is extended or adjusted under 35 U.S.C. 154(b) by 1 day.

This patent is subject to a terminal disclaimer.

(21) Appl. No.: 17/048,709

(22) PCT Filed: May 7, 2019

(86) PCT No.: PCT/EP2019/061655
§ 371 (c)(1),
(2) Date: Oct. 19, 2020

(87) PCT Pub. No.: WO2019/219452
PCT Pub. Date: Nov. 21, 2019

(65) Prior Publication Data
US 2021/0171719 A1    Jun. 10, 2021

(30) Foreign Application Priority Data

May 17, 2018 (EP) ..................................... 18172876
Aug. 15, 2018 (EP) ..................................... 18189074

(51) Int. Cl.
| C08G 77/08 | (2006.01) |
| C08G 77/46 | (2006.01) |
| C08G 77/10 | (2006.01) |
| C08G 77/18 | (2006.01) |

(52) U.S. Cl.
CPC ............ *C08G 77/08* (2013.01); *C08G 77/10* (2013.01); *C08G 77/18* (2013.01); *C08G 77/46* (2013.01)

(58) Field of Classification Search
CPC ......... C08G 77/08; C08G 77/10; C08G 77/46
See application file for complete search history.

(56) References Cited

U.S. PATENT DOCUMENTS

| 2,527,591 A | 10/1950 | Speier |
| 2,910,496 A | 10/1959 | Bailey et al. |
| 3,346,610 A | 10/1967 | Omietanski et al. |
| 3,356,758 A | 12/1967 | Omietanski et al. |
| 3,595,885 A | 7/1971 | Rossmy et al. |
| 3,775,452 A | 11/1973 | Karstedt |
| 4,066,680 A | 1/1978 | Lewis et al. |
| 4,177,201 A | 12/1979 | De Montigny et al. |
| 4,355,171 A | 10/1982 | De Montigny et al. |
| 4,380,451 A | 4/1983 | Steinberger et al. |
| 4,417,068 A | 11/1983 | Kollmeier et al. |
| 4,497,962 A | 2/1985 | De Montigny et al. |
| 4,606,633 A | 8/1986 | Jeschke et al. |
| 5,147,965 A | 9/1992 | Ichinohe et al. |
| 5,158,922 A | 10/1992 | Hinney et al. |
| 5,420,221 A * | 5/1995 | Razzano ............... C07F 7/0874 528/16 |
| 5,773,548 A | 6/1998 | Schickmann et al. |
| 6,284,906 B1 * | 9/2001 | Paulasaari ............. C08G 77/08 556/451 |
| 6,307,082 B1 | 10/2001 | Klein et al. |
| 6,737,495 B2 * | 5/2004 | Bordone ................ C08G 77/08 528/23 |
| 7,196,153 B2 | 3/2007 | Burkhart et al. |
| 7,598,334 B2 | 10/2009 | Ferenz et al. |
| 7,612,158 B2 | 11/2009 | Burkhart et al. |
| 7,619,035 B2 | 11/2009 | Henning et al. |
| 7,645,848 B2 | 1/2010 | Knott et al. |
| 7,825,205 B2 | 11/2010 | Knott et al. |

(Continued)

FOREIGN PATENT DOCUMENTS

| DE | 1 545 110 A1 | 6/1969 |
| DE | 10 312 636 A1 | 9/2004 |

(Continued)

OTHER PUBLICATIONS

German International Search Report dated Jun. 6, 2019 in PCT/EP2019/061655 (4 pages).
English language International Search Report dated Jun. 6, 2019 in PCT/EP2019/061655 (3 pages).
German Written Opinion dated Jun. 6, 2019 in PCT/EP2019/061655 (7 pages).
Knott et al., U.S. Appl. No. 17/239,011, filed Apr. 23, 2021.
Knott et al., U.S. Appl. No. 17/297,372, filed May 26, 2021.
Knott et al., U.S. Appl. No. 17/476,417, filed Sep. 15, 2021.
Chojnowski et al., "Cationic Polymerization of a Model Cyclotrisiloxane with Mixed Siloxane Units Initiated by a Protic Acid. Mechanism of Polymer Chain Formation" Macromolecules, US, vol. 35, No. 27, Dec. 1, 2002, pp. 9904-9912 (9 pages).
European Search Report dated Dec. 21, 2018 in EP 18189074.0 (9 pages).

(Continued)

*Primary Examiner* — Marc S Zimmer
(74) *Attorney, Agent, or Firm* — Taylor English Duma LLP; Philip P. McCann

(57) ABSTRACT

Equilibrated trifluoromethanesulfonic acid-acidified α,ω-diacetoxypolydimethylsiloxanes, processes for the production thereof and SiOC-bonded, linear polydimethylsiloxane-polyoxyalkylene block copolymers of the structure type ABA and a process for the production thereof are described, wherein the production of SiOC-bonded, linear polydimethylsiloxane-polyoxyalkylene block copolymers of the structure type ABA is effected by reacting trifluoromethanesulfonic acid-acidified acetoxysiloxane with polyetherols optionally in the presence of buffer mixtures and optionally an additional condensation catalyst and optionally in the presence of an inert solvent.

18 Claims, No Drawings

(56) References Cited

U.S. PATENT DOCUMENTS

| | | | |
|---|---|---|---|
| 7,825,206 B2 | 11/2010 | Neumann et al. | |
| 7,825,209 B2 | 11/2010 | Knott et al. | |
| 8,138,294 B2 | 3/2012 | Henning et al. | |
| 8,283,422 B2 | 10/2012 | Schubert et al. | |
| 8,309,664 B2 | 11/2012 | Knott et al. | |
| 8,334,355 B2 | 12/2012 | Henning et al. | |
| 8,420,748 B2 | 4/2013 | Henning et al. | |
| 8,598,295 B2 | 12/2013 | Henning et al. | |
| 8,623,984 B2 | 1/2014 | Henning et al. | |
| 8,779,079 B2 | 7/2014 | Henning et al. | |
| 9,068,044 B2 | 6/2015 | Schubert et al. | |
| 9,783,635 B2 | 10/2017 | Schubert et al. | |
| 10,399,998 B2 | 9/2019 | Knott et al. | |
| 10,414,871 B2 | 9/2019 | Knott et al. | |
| 10,414,872 B2 | 9/2019 | Knott et al. | |
| 10,519,280 B2 | 12/2019 | Knott et al. | |
| 10,526,454 B2 | 1/2020 | Knott et al. | |
| 10,752,735 B2 | 8/2020 | Knott et al. | |
| 10,766,913 B2 | 9/2020 | Knott et al. | |
| 10,954,344 B2 | 3/2021 | Knott et al. | |
| 11,006,429 B2* | 5/2021 | Davydov | H04W 72/082 |
| 11,021,575 B2* | 6/2021 | Knott | C08G 77/392 |
| 11,066,429 B2 | 7/2021 | Knott et al. | |
| 2003/0109659 A1 | 6/2003 | Bordone et al. | |
| 2004/0186260 A1 | 9/2004 | Hohenberg et al. | |
| 2005/0136269 A1 | 6/2005 | Doehler et al. | |
| 2005/0277730 A1* | 12/2005 | Boisson | C08G 77/08 |
| | | | 524/588 |
| 2007/0299231 A1 | 12/2007 | Doehler et al. | |
| 2010/0022435 A1 | 1/2010 | Henning et al. | |
| 2011/0021693 A1 | 1/2011 | Henning et al. | |
| 2011/0301254 A1 | 12/2011 | Knott et al. | |
| 2013/0041115 A1 | 2/2013 | Knott et al. | |
| 2013/0267665 A1 | 10/2013 | Huggins et al. | |
| 2013/0345318 A1 | 12/2013 | Schubert et al. | |
| 2014/0256844 A1 | 9/2014 | Henning et al. | |
| 2015/0274973 A1 | 10/2015 | Bae et al. | |
| 2020/0339612 A1 | 10/2020 | Knott et al. | |
| 2020/0377524 A1 | 12/2020 | Knott et al. | |
| 2020/0377525 A1 | 12/2020 | Knott et al. | |
| 2020/0377640 A1 | 12/2020 | Knott et al. | |
| 2020/0377660 A1 | 12/2020 | Knott et al. | |
| 2020/0377663 A1 | 12/2020 | Favresse et al. | |
| 2020/0377665 A1 | 12/2020 | Knott et al. | |
| 2020/0377666 A1 | 12/2020 | Knott et al. | |
| 2020/0377667 A1 | 12/2020 | Favresse et al. | |
| 2020/0377669 A1 | 12/2020 | Knott et al. | |
| 2020/0377684 A1 | 12/2020 | Hermann et al. | |
| 2020/0377686 A1 | 12/2020 | Knott et al. | |
| 2021/0130551 A1 | 5/2021 | Knott et al. | |
| 2021/0163687 A1 | 6/2021 | Knott et al. | |
| 2021/0253780 A1 | 8/2021 | Wessely et al. | |
| 2021/0253799 A1 | 8/2021 | Knott et al. | |
| 2021/0301099 A1 | 9/2021 | Knott et al. | |

FOREIGN PATENT DOCUMENTS

| | | |
|---|---|---|
| DE | 10 359 764 A1 | 7/2005 |
| DE | 20 2010 017 915 U1 | 3/2013 |
| EP | 0 000 328 | 1/1979 |
| EP | 0 003 285 A1 | 8/1979 |
| EP | 0 025 822 A2 | 4/1981 |
| EP | 0 075 703 A1 | 4/1983 |
| EP | 0 475 440 A2 | 3/1992 |
| EP | 0 654 302 A1 | 5/1995 |
| EP | 1 031 603 A2 | 8/2000 |
| EP | 1 935 923 A2 | 6/2008 |
| WO | 95/01983 A1 | 1/1995 |
| WO | 2014/104388 A2 | 7/2014 |
| WO | 2014/104390 A2 | 7/2014 |
| WO | 2021/105037 A1 | 6/2021 |

OTHER PUBLICATIONS

European Search Report dated Nov. 13, 2018 in EP 18172876.7 (6 pages).

Silicones, Encyclopedia of Polymer Science and Techno, Wiley, US, pp. 765-841, Apr. 15, 2003 (77 pages).

* cited by examiner

LINEAR POLYDIMETHYLSILOXANE-POLYOXYALKYLENE BLOCK COPOLYMERS OF THE STRUCTURE TYPE ABA

CROSS REFERENCE TO RELATED APPLICATIONS

This application is a 35 U.S.C. § 371 U.S. national phase entry of International Application No. PCT/EP2019/061655 having an international filing date of May 7, 2019, which claims the benefit of European Application No. 18172876.7 filed May 17, 2018 and European Application No. 18189074.0 filed Aug. 15, 2018, each of which is incorporated herein by reference in its entirety.

FIELD

The invention relates to equilibrated trifluoromethanesulfonic acid-acidified α,ω-diacetoxypolydimethylsiloxanes, to processes for the production thereof and to SiOC-bonded, linear polydimethylsiloxane-polyoxyalkylene block copolymers of the structure type ABA and to processes for the production thereof.

According to the current state of the art production of the economically important class of SiOC-bonded polyether siloxanes, also known as silicone polyethers or siloxane-polyether copolymers, employs a plurality of process variants.

BACKGROUND

SiOC bonds are classically formed by the reaction of a siloxane having a leaving group (for example halogen) bonded to the silicon atom and an alcohol or polyetherol. The latter is typically obtained by alkoxylation of monohydroxyl-functional starter compounds such as for example butanol with alkylene oxides. Chlorosiloxanes in particular are widely used as starting compounds for this reaction type. However, chlorosiloxanes are difficult to handle since they are extremely reactive. Their use has a further disadvantage that the hydrogen chloride formed in the course of the reaction limits handling to corrosion-resistant plants and results in ecological problems. In addition, chlorine compounds which are undesirable on toxicology grounds may be formed in the presence of chlorosiloxanes and alcohols/polyetherols. It is moreover not easy to achieve a quantitative conversion in the reaction of a chlorosiloxane with an alcohol or polyetherol and the OH-functional component must therefore often be employed in a stoichiometric excess based on the SiCl functions of the siloxane component. In practice the use of an excess of polyether means that the silicone polyethers thus produced inevitably contain relatively large amounts of unreacted excess polyethers which reduce the concentration of the surfactant silicone polyethers and impair the performance properties of the target products. It is often necessary in the chlorosiloxane route to employ bases as HCl scavengers to achieve good conversions. The use of these bases results in the formation of large quantities of salt whose removal on an industrial scale causes problems.

One possible alternative to this process comprises reacting alcohols or polyetherols with hydrogensiloxanes in which hydrogen is directly bonded to silicon. Under suitable conditions the formation of the SiOC moiety here results merely in elimination of hydrogen. This dehydrogenative condensation proceeds only in the presence of a catalyst.

U.S. Pat. No. 5,147,965 refers to a process described in Japanese patent publication JP480-19941 comprises reacting a hydrogensiloxane with an alcohol in the presence of alkali metal hydroxides or alkali metal alkoxides. The disadvantage of this process is that the catalysts need to be neutralized once the reaction is complete and the resulting salt load, while smaller than that in the chlorosiloxane process, still requires costly and inconvenient removal by filtration. EP-A-0475440 describes a process where hydrogensiloxanes are reacted with an alcohol in the presence of an organic acid and a Pt salt. The reaction unavoidably requires the use of large amounts of organic acid (0.1 to 1 mol based on alcohol), toluene as solvent and a platinum salt. Since both toluene and acid are unwanted in the end product they must in turn be removed once the reaction has ended. In addition, platinum salts are not only costly but also not unconcerning from a physiological standpoint. Particularly in the cosmetics industry sector there is a demand for products free from platinum.

The process described in J. Boyer, R. J. P. Corriu, R. Perz, C. Reye, J. Organomet. Chem. 1978, 157, 153-162 eschews the use of heavy metals. Salts such as potassium tartrate, phthalate or formate for example are used as heterogeneous catalysts. However, the reactions require the use of equimolar amounts of the salts based on the SiH units and are successful only at high temperatures of about 180° C. Both the drastic conditions and the required large quantities of salt render this process unattractive for industrial scale operation.

Patent applications DE10312636 and DE10359764 employ boron-containing catalysts for the dehydrogenative condensation of hydrogensiloxanes and alcohols. Irrespective of the attractiveness of these dehydrogenative processes for SiOC bond formation especially in relation to the avoidance of liquid and/or solid byproducts, both the use of costly and toxic catalysts such as for example tris(pentafluorophenyl)borane and the safe handling of the hydrogen gas formed in the synthesis stand in the way of widespread application of this technology.

SUMMARY

Against this background the technical problem to be solved is that of making it possible to provide linear SiOC-bonded polydimethylsiloxane-polyoxyalkylene block copolymers of the structure type ABA while overcoming the abovementioned difficulties.

It has now been found that, surprisingly, the provision of linear, SiOC-bonded polyether siloxanes of the structure type ABA starting from cyclic siloxanes, in particular $D_4$ and/or $D_5$, is successfully effected by reacting equilibrated trifluoromethanesulfonic acid-acidified acetoxysiloxane with polyether monools in the presence of buffer mixtures and optionally an additional condensation catalyst and optionally in the presence of an inert solvent, wherein the equilibrated trifluoromethanesulfonic acid-acidified acetoxysiloxane is especially obtainable by trifluoromethanesulfonic acid-catalysed reaction of cyclic siloxanes, in particular $D_4$ and/or $D_5$, with acetic anhydride preferably in the presence of acetic acid. This forms part of the subject matter of the invention. $D_4$ stands for octamethylcyclotetrasiloxane. $D_5$ stands for decamethylcyclopentasiloxane.

DETAILED DESCRIPTION

The relevant linear, SiOC-bonded polyether siloxanes of the structure type ABA form a further part of the subject matter of the invention and advantageously feature a particularly high purity.

Routes to acetoxy-functional siloxanes are described in the literature.

For instance the non-equilibrating opening of simple unbranched siloxane cycles with acetic anhydride to afford short-chain, chain-terminal, acetoxy-bearing siloxanes in the presence of catalysts is known from numerous publications and patent applications.

Borisov and Sviridova describe the opening of cyclic dimethylsiloxanes with acetic anhydride in the presence of catalytic amounts of iron(III) chloride to afford short-chain α,ω-acetoxysiloxanes (S. N. Borisov, N. G. Sviridova, J. Organomet. Chem. 11 (1968), 27-33). Lewis et al. are concerned in U.S. Pat. No. 4,066,680 with the production of short-chain α,ω-siloxanediols, wherein octamethylcyclotetrasiloxane is reacted with acetic anhydride and acetic acid over acid-treated fuller's earths and the thus-obtained mixtures of short-chain α,ω-acetoxysiloxanes are hydrolysed in alkalified water. Lewis attributes to the acetic acid, which de facto reduces the space-time yield of the process and which makes up 2% to 20% of the reaction mixture, not only the function of a solvent but also the function of a co-catalyst. However, the α,ω-acetoxysiloxanes obtained as a precursor according to this teaching are by no means equilibrates, as is clearly apparent from example 2 of the document, since the gas chromatography analysis for the entire reaction mixture shows a proportion of 14.20% $D_4$ or after removal of the acetic acid present in the mixture in a proportion of 19.04% a proportion of 17.53% $D_4$ based on the pure siloxane matrix. If account is also taken of the proportions of the typically co-considered low molecular weight cycles $D_3$ (1.55%), $D_5$ (10.42%) and $D_6$ (0.54) the content of cyclosiloxanes is 30.04% and thus far greater than the otherwise customary equilibrium proportion of about 13 percent by weight that is expected in equilibrations (see in this regard WO 95/01983, page 1, lines 26 to 33).

U.S. Pat. No. 3,346,610 likewise discloses a route to acetoxy-bearing, short-chain siloxanes based on metal-halide-induced acetoxy-modification of strained cyclic siloxanes by reacting said siloxanes with acetoxy-containing silicone compounds. A multiplicity of Friedel-Crafts-active metal halides act as a catalyst here, wherein zinc chloride is commended as preferred. A specific objective of U.S. Pat. No. 3,346,610 is the acetoxy-modification of strained diorganosiloxane cycles with deliberate avoidance of equilibration processes.

The prior art thus relates to endeavors which provide for the opening of cyclic siloxanes—sometimes strained cyclosiloxanes—with acyloxy-containing reactants and which have for their objective to obtain defined linear short-chain siloxane species still requiring separation by means of fractional distillation.

However, the pure-chain acetoxy-modified siloxane compounds of defined molar mass that have been synthesized by this route are unsuitable for the production of organomodified siloxanes, in particular polyether siloxanes, that are employed in demanding industrial applications, for example in PU foam stabilization or in the defoaming of fuels, etc. Active ingredients that effectively address such a field of use are always characterized by a broad polymer distribution comprising high, medium and low molar masses, since the oligomers present therein, depending on their molar mass and hence their diffusion characteristics, can very commonly be imputed to have differentiated surfactant tasks in different time windows of the respective process.

Older routes for producing branched SiOC-bonded silicone polyethers for example also utilize inter alia the acid-catalysed reaction of chlorosilanes with acetic acid in the presence of siloxane cycles (U.S. Pat. No. 4,380,451). In addition to the fundamental disadvantages of chlorochemistry specified at the outset it is a feature of these processes that the replacement of silicon-bonded chlorine by acetoxy functions is incomplete as is apparent from the proposed (ibid., column 4, 1st line) siloxane intermediate formula. Similarly problematic is the teaching of EP0000328B1 which describes a process for producing linear and branched equilibrated organopolysiloxanes by reacting a chlorosilane or partial hydrolysates thereof with organosiloxanes and monobasic carboxylic acids in the presence of an acidic equilibration catalyst. With regard to the GC analysis of the α,ω-diacetoxypolydimethylsiloxanes disclosed therein it is stated (ibid., page 6, line 30) that the chlorosiloxanes present in small amounts were not taken into account in the evaluation of the GC.

Acyloxyorganopolysiloxanes and in particular organosiloxanes having terminal acyloxy groups are likewise known as starting materials for subsequent reactions. Thus, for example the acyloxy groups in a diorganosiloxane may be hydrolysed, whereupon the hydrolysate may be dehydrated and the dehydrated hydrolysate polymerized to form flowable diorganopolysiloxane. These flowable polysiloxanes are suitable as starting materials for the production of viscous oils and rubbers which may be cured to afford silicone elastomers.

Organosiloxanes provided with terminal acyloxy groups may be obtained for example by reaction of an alkyl siloxane and an organic acid and/or the anhydride thereof in the presence of sulfuric acid as catalyst. Such a process is described in U.S. Pat. No. 2,910,496 (Bailey et al.). Although this process in principle also affords organosiloxanes having terminal acyloxy groups, the process has the disadvantage that the reaction product consists of a mixture of acyloxy-containing siloxanes and acyloxy-bearing silanes of varying composition. In particular, the teaching in this regard explains that alkyl siloxane copolymers composed of M, D and T units are cleaved by the process into trimethylacyloxysilane, diacyloxydimethylsiloxane and methyltriacyloxysilane. Thus, Bailey obtains even after the 40 hour reaction of octamethylcyclotetrasiloxane with acetic anhydride and acetic acid at 136° C. to 147° C. and after neutralization of the sulfuric acid used as catalyst, separation of the salts and removal of water, residual acetic acid and acetic anhydride, a complex substance mixture and certainly not an equilibrate which is then subjected to fractional distillation (see example, ibid.). The chemical identity of the thus obtained fractions II and IV remains unclear and it is therefore difficult in this way to obtain defined products or to separate these in high yields from the mixture.

Citing Bailey et al. (U.S. Pat. No. 2,910,496), DE-OS1545110 (A1) (Omietanski et al.) teaches a process in which an acyloxy group of an acyloxysiloxane is reacted with the hydroxyl group of a polyoxyalkylenehydroxy polymer to afford a siloxane-oxyalkylene block mixed polymer and a carboxylic acid, wherein the carboxylic acid is removed from the reaction mixture. The solvent- and catalyst-free reactions described therein in some cases require considerable reaction times (up to 11.5 hours (example 1)), very high reaction temperatures which are harmful to the product (150° C. to 160° C. (example 1)) and application of an auxiliary vacuum/stripping of the reaction matrix with dry nitrogen over the entire reaction duration and despite the harsh reaction conditions do not always achieve complete conversion at the product stage (example 9, ibid.).

From a production engineering standpoint the combination of high reaction temperatures and long reaction times and also the unpredictable product quality are to the detriment of the process described by Omietanski et al.

U.S. Pat. No. 3,595,885 teaches a process for producing equilibrated acyloxy-functionalized siloxanes from equilibrated chlorosiloxanyl sulfates by reaction with carboxylic acids and/or carboxylic acid salts and/or carboxylic acid anhydrides. The teaching indicates (column 5/lines 72-74) that products containing sulfuric acid groups must be expected (—$SO_4$— and/or —$OSO_3H$ bonded to Si) when pure carboxylic acids and/or carboxylic acid anhydrides are employed. However, the examples supporting the remaining carboxylic acid salt route also do not demonstrate the freedom from sulfuric acid of the obtained acyloxysiloxanes, thus, however, rendering meaningless the stated objective of using the substances described therein as components in cold-curing silicone rubbers since these are reacted with hydroxyl-functional silicones in the presence of a tin catalyst to hydrolyse the siloxanyl sulfate functions. This chlorine route characterized by questionable product quality is therefore not suitable for demanding applications (see in this regard also example IV, <0.5% chlorine content).

In addition the reference to equilibrated acyloxy-functionalized siloxanes therein is not applicable. If for example bridging sulfato groups incorporated in the silicone scaffolds were to be dissolved-out by the treatment with carboxylic acid salts, this will always afford shorter acyloxy-terminated cleavage products so that the resulting mixture is in no way a true equilibrate especially in comparison to the starting material.

It has surprisingly been found in the context of the present invention that equilibrated α,ω-diacetoxypolydimethylsiloxanes may be produced by the reaction of siloxane cycles (in particular comprising $D_4$ and/or $D_5$) with acetic anhydride in the presence of trifluoromethanesulfonic acid and preferably acetic acid.

Also forming part of the subject matter of the invention is thus a process for producing trifluoromethanesulfonic acid-acidified equilibrated α,ω-diacetoxypolydimethylsiloxanes, wherein cyclic siloxanes, in particular comprising $D_4$ and/or $D_5$ are reacted with acetic anhydride using trifluoromethanesulfonic acid as catalyst and preferably acetic acid.

In one exemplary but also preferred embodiment in the context of the abovementioned process according to the invention with thorough commixing the reactants are treated with preferably 0.1 to 0.3 percent by mass of trifluoromethanesulfonic acid based on the total reaction mass and then preferably heated to temperatures of 140° C. to 160° C. for a duration of 4 to 8 hours. The initially slightly cloudy reaction mixture becomes a clear, equilibrated trifluoromethanesulfonic acid-acidified α,ω-diacetoxypolydimethylsiloxane. Advantageously even after lengthy storage these products may also be successfully used for producing SiOC-bonded, linear polydimethylsiloxane-polyoxyalkylene block copolymers of the structure type ABA in the context of the present invention.

As will be appreciated by those skilled in the art, under standard pressure conditions (1013.25 hPa) and at a constant ratio of acetic anhydride to cyclic siloxanes not only the chosen reaction temperature but also the chosen amount of catalyst added (trifluoromethanesulfonic acid) and the chosen reaction time affect the achieved degree of acetylation and thus also the individual position of the equilibrium established under these conditions. Accordingly the trifluoromethanesulfonic acid-acidified α,ω-diacetoxypolydimethylsiloxanes produced at the particularly preferred reaction temperature of 150° C. and at 0.1% by mass of trifluoromethanesulfonic acid addition exhibit very constant degrees of acetylation of about 80 val % (with about 20 val % of free acetic anhydride) based on the amount of employed acetic anhydride after a reaction time of 6 hours. The amount of substance in val corresponds to the amount of substance in mol multiplied by the respective stoichiometric valence. Acetic anhydride has a stoichiometric valence of 2 since it is a formal donor of two acetoxy groups. Raising the reaction temperature to 160° C. together with an increase in the trifluoromethanesulfonic acid addition to 0.2% in turn results very reproducibly in degrees of acetylation of about 90 val % (with about 10 val % of free acetic anhydride) based on the amount of employed acetic anhydride after a reaction time of 6 hours. Since the trifluoromethanesulfonic acid represents a significant cost factor optimizations within the described parameter field may easily be undertaken in the context of the inventive teaching.

Thus, reproducible industrial production of the α,ω-diacetoxypolydimethylsiloxanes according to the invention requires just a few reference laboratory experiments to determine the individual position of the equilibrium constantly established under the abovementioned conditions using $^{29}$Si-NMR and on a supplementary basis using $^{13}$C-NMR and also $^1$H-NMR spectroscopy and thus to specify optimal production conditions.

In the context of the present invention it has surprisingly also been found that the additional use of acetic acid in the process according to the invention for producing trifluoromethanesulfonic acid-acidified equilibrated α,ω-diacetoxypolydimethylsiloxanes allows for a further improvement in equilibration quality. The additional use of acetic acid thus corresponds to a very particularly preferred embodiment of the invention. It has a positive effect on achieving acetoxy functionalization and in this regard allows for a yield improvement based on the employed acetic anhydride but especially also allows for superior equilibration results even after a very short reaction time (for example after 4 hours/example 6).

Employable as an indicator for reaching the equilibrium is the total cycles content determined by gas chromatography and defined as the sum of the $D_4$-, $D_5$-, $D_6$-contents based on the siloxane matrix and ascertained after derivatization of the α,ω-diacetoxypolydimethylsiloxanes to the corresponding α,ω-diisopropoxypolydimethylsiloxanes. The inventive use of the acetic acid here makes it possible to readily undershoot otherwise customary equilibrium proportions of about 13 percent by weight. It is therefore in accordance with a preferred embodiment when equilibrium proportions of the total cycles content of less than 13, preferably less than 12, percent by weight are realized for the linear α,ω-diacetoxypolydimethylsiloxanes.

It is therefore in accordance with a particularly preferred embodiment of the present invention when in the process for producing trifluoromethanesulfonic acid-acidified equilibrated α,ω-diacetoxypolydimethylsiloxanes acetic acid is added in amounts of 0.4 to 3.5 percent by weight, by preference 0.5 to 3 percent by weight, preferably 0.8 to 1.8 percent by weight, particularly preferably in amounts of 1.0 to 1.5 percent by weight, based on the reaction matrix consisting of acetic anhydride and cyclic siloxanes.

Also forming part of the subject matter of the present invention are trifluoromethanesulfonic acid-acidified, equilibrated α,ω-diacetoxypolydimethylsiloxanes of general formula

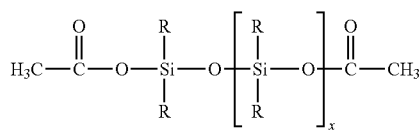

where R=methyl,
which have an average chain length determined by $^{29}$Si-NMR spectroscopy of $0 \leq X \leq 250$, preferably $5 \leq X \leq 100$, particularly preferably $10 \leq X \leq 30$,
and contain 0.1 to 0.3 percent by mass of trifluoromethanesulfonic acid
and 5 to 43 val %, preferably 11 to 25 val %, of free acetic anhydride based on the acetic anhydride equivalent chemically bonded in the α,ω-diacetoxypolydimethylsiloxane.

These are obtainable by the process described hereinabove.

These trifluoromethanesulfonic acid-acidified, equilibrated α,ω-diacetoxypolydimethylsiloxanes according to the invention undergo swift and also complete conversion to afford SiOC-bonded polyether siloxanes of high purity even at moderate temperatures.

The term "purity" used in the context of the present invention in relation to the ABA-structured, SiOC-bonded silicon polyethers relates in particular to the achieved degree of freedom from halide and in particular chloride.

Freedom from chloride is always desirable and required in particular when the ABA-structured, SiOC-bonded silicone polyethers are to be employed as surfactant components in cleaning formulations for the cleaning of magnetic heads for example. Payment with credit cards brings the credit cards soiled with skin fats, cosmetics, dust or else in particular with moisture (for example sweat) into contact with a magnetic head or else with chip reading contacts. The extended use of bank machines with a multiplicity of credit cards and the accompanying buildup of soiling increases the likelihood of malfunctions right up to nonacceptance of the credit card used. If the contact surfaces covered with metal oxide residues are cleaned with a cleaning liquid the application of corrosion-promoting chloride ions is to be avoided at all costs.

The linear ABA-structured, SiOC-bonded polydimethylsiloxane/polyoxyalkylene block copolymers obtainable by the process according to the invention in which trifluoromethanesulfonic acid-acidified, equilibrated α,ω-diacetoxypolydimethylsiloxane is reacted with polyether monools in the presence of buffer mixtures and optionally an additional condensation catalyst and optionally in the presence of an inert solvent also form part of the subject matter of the invention.

Particularly preferably employed buffer mixtures consist of sodium trichloroacetate and acetic acid or of sodium acetate and acetic acid. The use of these liquid buffer mixtures, in particular of the buffer mixtures particularly preferred according to the invention, is advantageous in terms of production particularly compared to the use of simple solid bases since the metered addition of a liquid is always easier than handling pulverulent solids. In particular, the use of the buffer mixtures according to the invention, particularly the preferred buffer mixtures, makes it possible to provide colorless or virtually colorless polyether siloxanes.

The linear ABA-structured, SiOC-bonded polydimethylsiloxane-polyoxyalkylene block copolymers have a high purity and preferably exhibit chloride contents of <10 ppm and are therefore preferentially suitable inter alia for applications of the type described hereinabove. Determination of the chloride content may be carried out using established methods via potentiometric argentometry or else ion chromatography (in particular based on the procedure of the standard ASTM D 7319-07). Since corrosion phenomena are known to be brought about both by the presence of inorganic chloride and also by the presence of organochlorine compounds in the context of the present teaching chloride content is always to be understood as meaning the analytically determinable total chlorine content.

It has been found according to the invention that swift and complete conversion of trifluoromethanesulfonic acid-acidified, equilibrated α,ω-diacetoxypolydimethylsiloxanes with polyether monools while avoiding discoloration of the reaction product is performed in the presence of buffer mixtures and optionally an additional condensation catalyst such as for example trichloroacetic acid. The use of trichloroacetic acid corresponds to a particularly preferred embodiment of the invention.

In a preferred embodiment of the invention the process for producing SiOC-bonded, linear polydimethylsiloxane-polyoxyalkylene block copolymers of the structure type ABA has the feature that the polyether monool is initially treated with buffer mixtures and optionally an additional condensation catalyst optionally in the presence of an inert solvent and then admixed with trifluoromethanesulfonic acid-acidified, equilibrated α,ω-diacetoxypolydimethylsiloxane and then optionally using an azeotrope-forming solvent the liberated acetic acid and the acetic acid that may be present in the system is thermally removed together with the solvent and the obtained SiOC-bonded, linear polydimethylsiloxane-polyoxyalkylene block copolymer is neutralized by addition of an auxiliary base, filtered and optionally end-stabilized.

The amount of the base employed for treating the polyether monool in the buffer mixture is preferably measured such that it corresponds at least to the stoichiometric equivalent, preferably at least to the 2-fold stoichiometric equivalent, of the trifluoromethanesulfonic acid present in the α,ω-diacetoxypolydimethylsiloxane (see in this regard also examples 2 and 3).

It is preferable according to the invention when the buffer mixtures employed already contain proportions of the condensation catalyst and particularly preferably contain the condensation catalyst in the form of a salt. The trifluoromethanesulfonic acid present in the α,ω-diacetoxypolydimethylsiloxane is thus neutralized and liberates the condensation catalyst from its salt.

If in the case of trichloroacetic acid which is particularly preferably employed as the condensation catalyst according to the invention the neutralization described here already results in the liberation of 0.2 to 0.5% by mass based on the total amount of the reactants provided for the SiOC-bonding reaction (namely α,ω-diacetoxypolydimethylsiloxane plus polyether monool) a treatment with additional amounts of trichloroacetic acid that may be required for a successful swift performance of the condensation reaction may be dispensed with, thus corresponding to a preferred embodiment of the invention.

The buffer mixtures particularly preferably employed according to the invention comprise sodium trichloroacetate and acetic acid or comprise sodium acetate and acetic acid.

If the amount of the base used for treatment of the polyether monool in the buffer mixture is as specified hereinabove measured according to the trifluoromethanesulfonic acid equivalent derived from the α,ω-diacetoxypolydimethylsiloxane the trichloroacetic acid amount particularly preferably employed according to the invention is based on the total amount of the reactants provided for the SiOC-bond forming reaction (α,ω-diacetoxypolydimethylsiloxane plus polyether monool.

According to the invention the trichloroacetic acid amount to be employed in the context of a preferred embodiment is in the range from preferably 0.1 to 0.7% by mass, preferably between 0.2 to 0.5% by mass, based on the total amount of the reactants provided for the SiOC-bond forming reaction (α,ω-diacetoxypolydimethylsiloxane plus polyether monool).

The amount of the acetic acid employed for dissolution of the buffer mixture in the context of a preferred embodiment is preferably chosen such that it is sufficient to produce a clear buffer solution which is free from salt fractions and which may be metered into the reaction matrix without losses. Usage amounts of acetic acids in excess thereof are furthermore largely acritical for the successful performance of the process according to the invention but large amounts are not advantageous either since they must be removed from the reaction matrix again subsequently.

In this context and on account of the crystalline habit of the trichloroacetic acid particularly preferably employed according to the invention, preference in industrial practice is naturally given to any process variants which allow the condensation catalyst to be introduced into the reaction system in the form of a solution and not as a solid, particularly preferably together with the buffer mixture.

The possibility of the appearance of discolorations also depends on the temperatures to which the reaction mixture is subjected and thus giving rise to several preferred embodiments of the process according to the invention.

In a further preferred embodiment the trifluoromethanesulfonic acid-acidified, equilibrated α,ω-diacetoxypolydimethylsiloxane is initially charged with polyether monool(s) at temperatures of <25° C. with stirring and undesired discoloration of the reaction product is effectively countered by a subsequent introduction of a buffer mixture and optionally an additional condensation catalyst before heating of the reaction mixture.

In an embodiment particularly preferred according to the invention buffer mixtures are initially charged with stirring into the polyetherol or, respectively, polyetherol mixture provided for bonding even before the trifluoromethanesulfonic acid-acidified, equilibrated α,ω-diacetoxypolydimethylsiloxane is added (cf. in particular examples 2 and 3). Optional further addition of condensation catalysts such as for example trichloroacetic acid ensures swift conversion of the reactants. This reaction is preferably performed at temperatures between 50° C. to 90° C. and preferably over a duration of 2 to 6 hours.

Avoiding undesired discolorations in the polyether siloxane is very challenging in particular in the case of the reactant systems which result in SiOC-bonded, ABA-structured polyether siloxanes and comprise unsaturated moieties (for example allyloxy end groups) in the polyether components. These specific polyether siloxanes which in some cases have excellent pigment affinities are of exceptional importance as additives in paint and lacquer formulations.

As is demonstrated by a comparative experiment (example 4) a noninventive reaction of the trifluoromethanesulfonic acid-acidified α,ω-diacetoxypolydimethylsiloxane can result in severely dark brown-colored products.

It has moreover been found that, surprisingly, the polyether siloxanes produced according to the invention have an excellent storage stability. As a criterion for assessing the storage stability of the SiOC-bonded polyether siloxanes produced in accordance with the inventive teaching, viscosity is monitored as a function of time at a constant storage temperature by sampling since any possible degradation and/or growth processes sensitively manifest therein.

According to the invention, condensation catalysts are preferably employed. Compounds capable of catalysing the reaction of the acetoxysiloxane with polyether monools include in particular any Brönsted acids, preferably the simple mineral acids and methanesulfonic acid, phosphoric acid, phosphonic acids and/or else acidic salt-like compounds such as triflate salts, in particular bismuth triflate, and/or any Lewis-acidic compounds such as tin and organotin compounds, titanate esters, tetraalkoxy titanates, zinc acetylacetonate, zinc acetate and trispentafluorphenylborane. A very particularly preferably employed condensation catalyst is trichloroacetic acid. Such use of condensation catalysts, in particular trichloroacetic acid, corresponds to a particularly preferred embodiment of the invention.

Also forming part of the subject matter of this invention and a further preferred embodiment thereof is the salt-free replacement of acetoxy groups bonded to linear siloxanes by polyetheroxy radicals by reacting with stirring the trifluoromethanesulfonic acid-acidified acetoxy-bearing linear siloxane in the presence of buffer mixtures and optionally an additional condensation catalyst and optionally in an inert solvent together with the polyetherol and then in the context of a distillation removing the acetic acid formed and residual acetic anhydride employed optionally together with fractions of the solvent employed. This corresponds to a preferred embodiment of the invention for replacement of the siloxane-bonded acetoxy groups via the reaction with polyetherols (cf. also examples 3 and 4).

Preferred here are solvents which are inert in the context of the target substitution reaction (replacement of acetoxy radical by polyetheroxy radical) and which in preferred fashion form a thermally separable azeotrope with the acetic acid formed. This corresponds to a further preferred embodiment of the invention, wherein the use of an aromatic, preferably alkylaromatic, solvent is preferred.

Very particularly preferred among the solvents forming binary azeotropes with acetic acid is toluene. The use of toluene thus corresponds to a preferred embodiment of the invention. The boiling points of toluene and acetic acid are 110.6° C. and 118.5° C. respectively and the boiling point of the binary azeotrope is 105.4° C. The azeotrope has a composition of 72% by weight of toluene and 28% by weight of acetic acid (source: Handbook of Chemistry and Physics, 58th Edition, page D2, CRC-Press (1977-1978), West Palm Beach). It is typically possible to employ to this end without further drying a technical toluene having a water content of 0.03% by mass (water content determination by the Karl-Fischer method according to DIN 51777, DGF E-III 10 and DGF C-III 13a).

The continuous thermal removal of the acetic acid accompanying azeotrope formation ensures complete replacement of the acetoxy functions bonded to the siloxane scaffold by polyetheroxy radicals and thus corresponds to a particularly preferred embodiment of the invention.

Also very particularly preferred here is the application of an auxiliary vacuum since this minimizes the thermal stress on the SiOC-bonded linear polyether siloxane formed (cf. examples 2 and 3). This corresponds to a further preferred embodiment of the invention.

However, it has also been found that, surprisingly, the solventless transformation of trifluoromethanesulfonic acid-acidified, linear, acetoxy-comprising siloxanes into linear SiOC-bonded polyether siloxanes is achieved quantitatively very swiftly (within 3 hours) and moreover at very moderate temperatures (T=70° C.) (cf. examples 2 and 3).

When the replacement of the siloxane-bonded acetoxy groups is effected solventlessly via the reaction with polyether monools this therefore represents a further preferred embodiment of the invention.

For introduction of the acetoxy groups trifluoromethanesulfonic acid is preferably employed in concentrations of 0.1 to 0.3 percent by weight (% by weight) based on the total mass of the reaction batch. This corresponds to a particularly preferred embodiment of the invention.

According to the invention, in both the solvent-employing and solventless cases, the distillative removal of acetic acid formed and optionally present in the system may optionally be followed by a complete freeing of the SiOC-bonded polyether siloxane remaining in the distillation bottoms of all traces of residual acid preferably by addition of an auxiliary base such as for example sodium carbonate and subsequent filtration (cf. examples 2 and 3). This corresponds to a further preferred embodiment of the invention.

To ensure elevated storage stability the linear polyether siloxanes produced by the process according to the invention may additionally be admixed with small amounts of organic amines, for example N-methylmorpholine. This corresponds to a preferred embodiment of the invention.

In the final step of the process according to the invention the replacement of the acetoxy groups is undertaken by reaction of the trifluoromethanesulfonic acid-acidified acetoxysiloxane with polyether monools.

The polyether monools employable according to the invention are preferably those of formula (I)

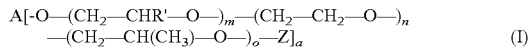

A[-O—(CH$_2$—CHR'—O—)$_m$—(CH$_2$—CH$_2$—O—)$_n$
—(CH$_2$—CH(CH$_3$)—O—)$_o$—Z]$_a$   (I)

where
A is an at least one carbon atom-comprising saturated or unsaturated organic radical, preferably an at least one carbon atom-comprising organic radical of an organic starter compound for preparing the compound, particularly preferably a linear or branched saturated or unsaturated hydrocarbon radical having 1-18 carbon atoms, preferably a methyl, ethyl, propyl, butyl, vinyl or allyl group,
R' is independently at each occurrence a saturated alkyl group comprising 2-18 carbon atoms or an aromatic radical, preferably an ethyl group or a phenyl radical respectively,
Z hydrogen
m equals from 0 to 50, preferably from 0 to 30, particularly preferably from 0 to 20,
n equals from 0 to 250, preferably from 3 to 220, particularly preferably from 5 to 200,
o equals from 0 to 250, preferably from 3 to 220, particularly preferably from 5 to 200,
a is 1,
with the proviso that the sum total of m, n and o is not less than 1. This corresponds to a preferred embodiment of the invention.

It is preferable to employ compounds of formula (I) comprising exclusively hydrogen atoms, oxygen atoms and carbon atoms.

The index values recited here and the value ranges of the indices specified may be understood to mean averages (weight averages) of the possible statistical distribution of the actual structures present and/or the mixtures thereof. This also applies to structural formulae reproduced per se exactly as such, for example formula (I).

The units labelled m, n, and o may either be statistically mixed or else may form a blockwise arrangement in the chain. Statistical distributions may have a blockwise structure with any number of blocks and any sequence or be subject to a randomized distribution; they may also have an alternating structure or else form a gradient along the chain; in particular, they can also form any mixed forms thereof in which groups of different distributions may optionally follow one another. Specific embodiments may lead to restrictions to the statistical distributions as a result of the embodiment. There is no change in the statistical distribution for all regions unaffected by the restriction.

In the context of the present invention, radical A is preferably to be understood as meaning radicals of substances forming the start of the to-be-produced compound of formulae (I) which is obtained by addition of alkylene oxides. The starter compound is preferably selected from the group of alcohols, polyetherols and phenols. Preferably employed as the starter compound containing the group A are a monovalent polyether alcohol and/or a monovalent alcohol or any desired mixtures thereof.

Monomers used with preference in the alkoxylation reaction are ethylene oxide, propylene oxide, butylene oxide and/or styrene oxide and also any desired mixtures of these epoxides. The different monomers may be used in pure form or as a mixture. A further epoxide can also be metered continuously over time into an epoxide already present in the reaction mixture, so as to give rise to an increasing concentration gradient of the epoxide added continuously. The polyoxyalkylenes formed are thus subject to a statistical distribution in the end product, restrictions being determinable via the metered addition. In this case of the continuous addition of a further epoxide to an epoxide already present in the reaction mixture, a structure gradient along the length of the chain is then to be expected. The correlations between metered addition and product structure are known to those skilled in the art.

It is preferable to employ in the process according to the invention compounds of formula (I) having a weight-average molar mass of 76 to 10 000 g/mol, preferably of 100 to 8000 g/mol and particularly preferably of 200 to 6000 g/mol.

Compounds of formula (I) that may be employed are preferably compounds derived from a compound of formula (II)

A[-OH]$a$   (II)

wherein the radical A derives from compounds selected from the group consisting of monovalent monomeric, oligomeric and polymeric alcohols, phenols, carbohydrates and carbohydrate derivatives, wherein particular preference is given to using compounds where the radical A derives from one or more alcohols from the group of butanol, 1-hexenol, octanol, dodecanol, stearyl alcohol, vinyloxybutanol, 2-ethylhexanol, cyclohexanol, benzyl alcohol, allyl alcohol, vinyl alcohol or from monovalent hydroxyl-bearing compounds based on natural products.

Particular preference is given to using compounds that are liquid at a pressure of 101 325 Pa and a temperature of 23° C.

Compounds of formula (I) employable in accordance with the invention as polyetherols and processes for the production thereof are described for example in EP0075703, U.S. Pat. No. 3,775,452 and EP1031603. Suitable processes utilize, for example, basic catalysts, for example alkali metal hydroxides and alkali metal methoxides. The use of KOH is particularly widespread and has been known for many years. Such processes typically comprise reacting a hydroxy-functional starter, generally of low molecular weight, i.e. having a molecular weight below 200 g/mol, such as butanol, allyl alcohol, propylene glycol, with an alkylene oxide such as ethylene oxide, propylene oxide, butylene oxide or a mixture of different alkylene oxides in the presence of the alkaline catalyst to afford a polyoxyalkylene polyether. The strongly alkaline reaction conditions in this so-called living polymerization promote various side reactions. The compounds of formulae (II) may also be produced by double metal cyanide catalysis. Polyethers produced by double metal cyanide catalysis generally have a particularly low content of unsaturated end groups of less than or equal to 0.02 milliequivalents per gram of polyether compound (meq/g), preferably less than or equal to 0.015 meq/g, particularly preferably less than or equal to 0.01 meq/g (test method ASTM D2849-69), contain distinctly fewer monools and generally have a low polydispersity of less than 1.5. The polydispersity (PD) may be determined by a method known per se to those skilled in the art by determining by gel permeation chromatography (GPC) both the number-average molecular weight (Mn) and the weight-average molecular weight (Mw). The polydispersity is defined by PD=Mw/Mn. The production of such polyethers is described in U.S. Pat. No. 5,158,922 and EP-A0654302 for example.

Irrespective of the production route, compounds of formula (I) preferably having a polydispersity Mw/Mn of 1.0 to 1.5, by preference having a polydispersity of 1.0 to 1.3, are preferentially suitable.

Depending on the alkylene oxide terminus, the polyether monools for use according to the invention may have a primary or secondary OH function. In terms of the aspect of the hydrolytic resistance of the obtained SiOC-bonded polyether siloxanes achieved later, the use of polyether monools comprising a secondary alcohol function is preferred in the context of the inventive teaching.

The inventive replacement of the acetoxy groups bonded to the α,ω-diacetoxypolydimethylsiloxane by reaction with polyether monools to afford SiOC-bonded, linear polyether siloxanes may be effected in the presence of solvents or preferably without solvents by intimate mixing of the reactants with stirring at reaction temperatures of 20° C. to 90° C., preferably at reaction temperatures of 30° C. to 80° C. This corresponds to a preferred embodiment of the invention.

The molar ratio of the reactants is preferably measured such that at least 1 mol of polyether-bonded OH functionality is employed per mol of acetoxy group of the α,ω-diacetoxypolydimethylsiloxane, preferably 1 to 2 mol of polyether-bonded OH functionality, particularly preferably 1.1 to 1.6 mol of polyether-bonded OH functionality, preferably 1.1 to 1.4 mol of polyether-bonded OH functionality per mol of acetoxy group of the α,ω-diacetoxypolydimethylsiloxane. This corresponds to a preferred embodiment of the invention.

The SiOC-bonded branched polyether siloxanes employed in a multiplicity of surface-active applications often have the feature that they contain polyether radicals of differing composition and/or molecular weight. Reacting the acetoxy-containing, equilibrated linear siloxane with a mixture of different polyetherols thus corresponds to a preferred embodiment of the process according to the invention. Those skilled in the art are familiar with the sometimes different reaction characteristics of the employed polyetherols so that with the objective in mind to attain a particular surface activity a number of guiding manual tests with polyetherol mixtures are made and these thus obtained products are then each performance-evaluated to achieve an optimal result.

According to the invention the replacement of the acetoxy groups by reaction with polyetherols is preferably effected over the course of 30 minutes to 8 hours. This corresponds to a preferred embodiment of the invention.

Also forming part of the subject matter of the invention is the use of this preparation produced by the process according to the invention as described hereinabove as a surfactant additive in noncorrosive cleaning solutions, as defoamers, as foam stabilizers, wetting agents, paint and flow additives and as demulsifiers.

EXAMPLES

The examples which follow are provided merely to elucidate this invention to those skilled in the art and do not constitute any limitation of the claimed subject matter whatsoever. The inventive determination of the water contents is in principle performed by the Karl Fischer method based on DIN 51777, DGF E-III 10 and DGF C-III 13a. $^{29}$Si-NMR spectroscopy was used for reaction monitoring in all examples.

In the context of the present invention the $^{29}$Si-NMR samples are analysed at a measurement frequency of 79.49 MHz in a Bruker Avance III spectrometer equipped with a 287430 sample head with a gap width of 10 mm, dissolved at 22° C. in CDCl$_3$ and against a tetramethylsilane (TMS) external standard [☐($^{29}$Si)=0.0 ppm].

GPCs (gel permeation chromatography) are recorded using THF as the mobile phase on an SDV 1000/10000 A column combination having a length of 65 cm, ID 0.80, at a temperature of 30° C. using a SECcurity$^2$ GPC System 1260 (PSS Polymer Standards Service GmbH).

The gas chromatograms are recorded on an Agilent Technologies GC 7890B GC instrument fitted with an HP-1 column having dimensions of 30 m×0.32 mm ID×0.25 μm dF (Agilent Technologies No. 19091Z-413E) using hydrogen as a carrier gas and employing the following parameters:
Detector: FID; 310° C.
Injector: Split; 290° C.
Mode: constant flow, 2 ml/min
Temperature programme: 60° C. at 8° C./min-150° C. at 40° C./min-300° C. 10 min.

Employed as an indicator for reaching the equilibrium is the total cycles content determined by gas chromatography and defined as the sum of the D4-, D5-, D6-contents based on the siloxane matrix and ascertained after derivatization of the α,ω-diacetoxypolydimethylsiloxanes to the corresponding α,ω-diisopropoxypolydimethylsiloxanes. The derivatization to afford the α,ω-diisopropoxypolydimethylsiloxanes is intentionally chosen in order to prevent a thermally induced retrocleavage reaction of the α,ω-diacetoxypolydimethylsiloxanes which may take place under the conditions of analysis by gas chromatography (regarding the retrocleavage reaction see inter alia J. Pola et al., Collect. Czech. Chem. Commun. 1974, 39(5), 1169-1176 and also W. Simmler, Houben-Weyl, Methods of Organic Chemistry, Vol. VI/2, 4th Edition, O-Metal Derivates of Organic Hydroxy Compounds p. 162 ff)).

The argentometric titration for determining the total chloride content in the ppm range is performed using a Metrohm Titroprocessor 736/751 fitted with a combined silver/metal electrode (for example Metrohm part no. 6.0418.100) using a silver nitrate solution c(AgNO3)=0.01 mol/l (for example Fluka Fixanal part no. 38310).

The employed polyether monools have water contents of about 0.2 percent by mass and are used without further pre-drying.

To ensure storage stability which is important in particular on production logistics grounds the acetoxysiloxanes produced according to the invention are, unless otherwise explicitly described in the relevant synthesis examples, initially stored in glass bottles at a storage temperature of 23° C. over a period of 3 weeks before they are reacted with the polyetherols to afford the corresponding SiOC-bonded, linear polydimethylsiloxane-polyoxyalkylene block copolymers/the corresponding α,ω-diisopropoxypolydimethylsiloxanes.

Example 1 (Inventive)

Production of an Acetoxy-Terminated, Linear Polydimethylsiloxane

In a 500 ml four-necked flask fitted with a KPG stirrer, internal thermometer and a reflux cooler 19.3 g (0.189 mol) of acetic anhydride together with 183.2 g (0.494 mol) of decamethylcyclopentasiloxane ($D_5$) are initially charged with stirring and admixed with 0.2 g (0.12 ml) of trifluoromethanesulfonic acid (0.1 percent by mass based on the total batch) and swiftly heated to 150° C. The initially slightly cloudy reaction mixture is held at this temperature for 6 hours with continued stirring.

After cooling of the batch a colorless, clear, mobile liquid is isolated, whose $^{29}$Si-NMR spectrum demonstrates the presence of Si-acetoxy groups in a yield of about 80% based on employed acetic anhydride corresponding to an α,ω-diacetoxypolydimethylsiloxane having an average total chain length of about 16. The potentiometric argentometry verifies a total chloride content of 2 ppm.

Example 2 (Inventive)

Production of an SiOC-Bonded, Linear Polydimethylsiloxane-Polyoxyalkylene Block Copolymer of the Structure Type ABA Having Allyloxy Termini (Solventless)

104.0 g of an allyl alcohol-started, polypropyleneoxy (polyethyleneoxy) group-containing polyetherol comprising 80% propylene oxide and having an average molar mass of 757 g/mol (determined according to OH number) are initially charged with stirring in a 500 ml four-necked flask fitted with a KPG stirrer, internal thermometer and reflux cooler. A buffer solution consisting of 0.32 g of sodium trichloroacetate (224 val % excess based on the trifluoromethanesulfonic acid present in the acetoxysilane), 0.37 g of trichloroacetic acid (0.2% based on the reaction mixture consisting of polyetherol and acetoxysilane) dissolved in 5 g of acetic acid are then added. 80.0 g of an acetoxy-terminated, linear siloxane produced according to example 1 are then added. The reaction batch is heated to 70° C. with further stirring and this reaction temperature is maintained for 3 hours.

The reflux cooler is replaced by a distillation bridge and the volatiles are distilled off at 70° C. with an applied auxiliary vacuum of <1 mbar.

After breaking the vacuum the warm distillation bottoms are admixed with 3.68 g of sodium carbonate $Na_2CO_3$ and the batch is stirred at 70° C. for a further 2 hours. After cooling to 23° C. the solid is removed using a filter press (Seitz K 300 filter sheet).

A colorless, clear polyether siloxane whose accompanying $^{29}$Si-NMR spectrum confirms the target structure is isolated.

Example 3 (Inventive)

Production of an SiOC-Bonded, Linear Polydimethylsiloxane-Polyoxyalkylene Block Copolymer of the Structure Type ABA Having Allyloxy Termini (Solventless)

104.0 g of an allyl alcohol-started, polypropyleneoxy (polyethyleneoxy)-containing polyetherol comprising 80% propylene oxide and having an average molar mass of 757 g/mol (determined according to OH number) are initially charged with stirring in a 500 ml four-necked flask fitted with a KPG stirrer, internal thermometer and reflux cooler. A buffer solution consisting of 0.16 g of sodium acetate (266 val % excess based on the trifluoromethanesulfonic acid present in the acetoxysilane), 0.37 g of trichloroacetic acid (0.2% based on the reaction mixture consisting of polyetherol and acetoxysilane) dissolved in 5 g of acetic acid are then added. 80.0 g of an acetoxy-terminated, linear siloxane produced according to example 1 are then added. The reaction batch is heated to 70° C. with further stirring and this reaction temperature is maintained for 3 hours.

The reflux cooler is replaced by a distillation bridge and the volatiles are distilled off at 70° C. with an applied auxiliary vacuum of <1 mbar.

After breaking the vacuum the warm distillation bottoms are admixed with 3.68 g of sodium carbonate $Na_2CO_3$ and the batch is stirred at 70° C. for a further 2 hours. After cooling to 23° C. the solid is removed using a filter press (Seitz K 300 filter sheet).

A colorless, clear polyether siloxane whose accompanying $^{29}$Si-NMR spectrum verifies the target structure is obtained.

Example 4 (Non-Inventive)

Production of an SiOC-Bonded, Linear Polydimethylsiloxane-Polyoxyalkylene Block Copolymer of the Structure Type ABA Having Allyloxy Termini (Solventless)

104.0 g of an allyl alcohol-started, polypropyleneoxy (polyethyleneoxy)-containing polyetherol comprising 80% propylene oxide and having an average molar mass of 757 g/mol (determined according to OH number) are initially charged with stirring in a 500 ml four-necked flask fitted with a KPG stirrer, internal thermometer and reflux cooler. 80.0 g of an acetoxy-terminated, linear siloxane produced according to example 1 are then added. The reaction batch is heated to 70° C. with further stirring and this reaction temperature is maintained for 3 hours. The batch already assumes a significant brown/black discoloration during the heating phase.

The reflux cooler is replaced by a distillation bridge and the volatiles are distilled off at 70° C. with an applied auxiliary vacuum of <1 mbar.

After breaking the vacuum the warm distillation bottoms are admixed with 3.68 g of sodium carbonate $Na_2CO_3$ and the batch is stirred at 70° C. for a further 2 hours. After cooling to 23° C. the solid is removed using a filter press (Seitz K 300 filter sheet).

A severely dark brown-colored clear polyether siloxane whose accompanying $^{29}$Si-NMR spectrum verifies the target structure is obtained.

Example 5 (Inventive)

Production of an Acetoxy-Terminated, Linear Polydimethylsiloxane

In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane ($D_5$) and 12.2 g of acetic acid (1.5% by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 6 hours with continued stirring.

After cooling of the batch a colorless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, internal thermometer and a reflux cooler 50.0 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia (NH$_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid, whose accompanying $^{29}$Si-NMR spectrum demonstrates the quantitative conversion of the α,ω-diacetoxypolydimethylsiloxane into an α,ω-diisopropoxypolydimethylsiloxane is isolated.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 4.94% | 4.04% | 1.07% | 10.06% | 11.00% |

Taking account of the isopropanol excess the contents of siloxane cycles ($D_4$, $D_5$ and $D_6$) are calculated solely based on the siloxane proportion.

Example 6 (Inventive)

Production of an Acetoxy-Terminated, Linear Polydimethylsiloxane

In a 1000 ml four-necked flask fitted with a KPG stirrer, internal thermometer and a reflux cooler 77.3 g (0.757 mol) of acetic anhydride together with 732.8 g (1.98 mol) of decamethylcyclopentasiloxane ($D_5$) and 24.3 g of acetic acid (3.0% by weight based on the total mass of the reactants) are initially charged with stirring and admixed with 1.62 g (0.88 ml) of trifluoromethanesulfonic acid (0.2 percent by mass based on the total batch) and swiftly heated to 150° C. The initially slightly cloudy reaction mixture is held at this temperature for 4 hours with continued stirring.

After cooling of the batch a colorless, clear, mobile liquid is isolated, whose $^{29}$Si-NMR spectrum demonstrates the presence of Si-acetoxy groups in a yield of about 93% based on employed acetic anhydride corresponding to an α,ω-diacetoxypolydimethylsiloxane having an average total chain length of about 14.

Conversion of the α,ω-Diacetoxypolydimethylsiloxane into the Corresponding α,ω-Diisopropoxypolydimethylsiloxane for Analytical Characterization Immediately after the synthesis in a 250 ml four-necked round-bottomed flask fitted with a KPG stirrer, internal thermometer and a reflux cooler 50.0 g of this trifluoromethanesulfonic acid-acidified, equilibrated α,ω-diacetoxypolydimethylsiloxane are mixed together with 11.3 g of a molecular sieve-dried isopropanol by stirring at 22° C. Gaseous ammonia (NH$_3$) is then introduced to the reaction mixture until alkaline reaction (moist universal indicator paper) and the mixture is then stirred at this temperature for a further 45 minutes. The precipitated salts are separated using a pleated filter.

A colorless, clear liquid, whose accompanying $^{29}$Si-NMR spectrum demonstrates the quantitative conversion of the α,ω-diacetoxypolydimethylsiloxane into an α,ω-diisopropoxypolydimethylsiloxane is isolated.

An aliquot of this α,ω-diisopropoxypolydimethylsiloxane is withdrawn and analysed by gas chromatography. The gas chromatogram shows the following contents (reported in percent by mass):

| $D_4$ | $D_5$ | $D_6$ | Total ($D_4$-$D_6$) | Isopropanol content |
|---|---|---|---|---|
| 4.09% | 2.62% | 0.86% | 7.57% | 4.60% |

Taking account of the isopropanol excess the contents of siloxane cycles ($D_4$, $D_5$ and $D_6$) are calculated solely based on the siloxane proportion.

The invention claimed is:

1. A process for producing trifluoromethanesulfonic acid-acidified equilibrated α,ω-diacetoxypolydimethylsiloxanes, wherein cyclic siloxanes comprising $D_4$ and/or $D_5$, are reacted with acetic anhydride using trifluoromethanesulfonic acid as catalyst and with addition of acetic acid.

2. The process according to claim 1, wherein the trifluoromethanesulfonic acid is employed in amounts of from 0.1 to 0.3 percent by mass based on the reaction matrix consisting of acetic anhydride and cyclic siloxanes.

3. The process according to claim 1, wherein the reaction is performed in a temperature range of from 140° C. to 160° C. and over a period of from 4 to 8 hours.

4. The process according to claim 1, wherein acetic acid is added in amounts of from 0.4 to 3.5 percent by weight, based on the reaction matrix consisting of acetic anhydride and cyclic siloxanes.

5. A trifluoromethanesulfonic acid-acidified, equilibrated α,ω-diacetoxypolydimethylsiloxanes of general formula

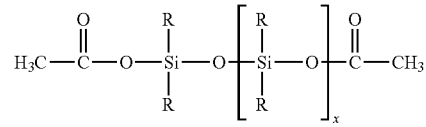

where R=methyl,
which have an average chain length determined by $^{29}$Si-NMR spectroscopy of $0 \leq X \leq 250$ and contain from 0.1 to 0.3 percent by mass of trifluoromethanesulfonic acid and from 5 to 43 val % of free acetic anhydride based on the acetic anhydride equivalent chemically bonded in the α,ω-diacetoxypolydimethylsiloxane.

6. The trifluoromethanesulfonic acid-acidified, equilibrated α,ω-diacetoxypolydimethylsiloxanes according to claim 5, wherein they have an average chain length determined by $^{29}$Si-NMR spectroscopy of $10 < X < 30$.

7. A process for producing SiOC-bonded, linear polydimethylsiloxane-polyoxyalkylene block copolymers of the structure type ABA, wherein trifluoromethanesulfonic acid-acidified, equilibrated α,ω-diacetoxypolydimethylsiloxane according to claim 5 is reacted with polyether monools in the presence of buffer mixtures, and optionally an additional condensation catalyst, and in the presence of an inert solvent.

8. The process according to claim 7, wherein the amount of the base employed for treating the polyether monool in the buffer mixture is measured such that it corresponds at least to the stoichiometric equivalent, preferably at least to the 2-fold stoichiometric equivalent, of the trifluoromethanesulfonic acid present in the α,ω-diacetoxypolydimethylsiloxane.

9. The process according to claim 7, wherein the polyether monool is initially treated with buffer mixtures and optionally an additional α,ω-diacetoxypolydimethylsiloxane,
and then using an azeotrope-forming solvent the liberated acetic acid and the acetic acid that may be present in the system is thermally removed together with the solvent and the obtained SiOC-bonded, linear polydimethylsiloxane-polyoxyalkylene block copolymer is neutralized by addition of an auxiliary base, filtered and end-stabilized.

10. The process according to claim 7, wherein a condensation catalyst is used for reacting the equilibrated α,ω-diacetoxypolydimethylsiloxane with polyether monools,
wherein condensation catalysts employed are Brönsted acids,
wherein the condensation catalyst, in particular the trichloroacetic acid, is in the range from 0.1 to 0.7 percent by mass, based on the total amount of the reactants provided for the SiOC-bond forming reaction, namely α,ω-diacetoxypolydimethylsiloxane and polyether monool.

11. The process according to claim 7, wherein the employed buffer mixtures contain at least proportions of the condensation catalyst and particularly preferably contain the condensation catalyst in the form of a salt.

12. The process according to claim 7, wherein the buffer mixtures comprise sodium trichloroacetate and acetic acid or sodium acetate and acetic acid.

13. The process according to claim 7, wherein solvents employed are aromatic, or in that the process is operated solventlessly.

14. The process according to claim 7, wherein the replacement of the acetoxy groups bonded to the α,ω-diacetoxypolydimethylsiloxane by reaction with polyether monools to afford SiOC-bonded, linear polyether siloxanes is effected in the presence of solvents by intimate mixing of the reactants with stirring at reaction temperatures of from 20° C. to 90° C. and from 30 minutes to 8 hours,
and/or,
in that the removal of the acetic acid liberated during the reaction between α,ω-diacetoxypolydimethylsiloxane and polyether monools and the acetic acid that may be present in the system is preferably effected by distillation at temperatures between 60° C. and 90° C. with application of an auxiliary vacuum.

15. The process according to claim 7, wherein the molar ratio of the reactants is measured such that at least 1 mol of polyether-bonded OH functionality is employed per mol of acetoxy group of the α,ω-diacetoxypolydimethylsiloxane.

16. The process according to claim 1, wherein acetic acid is added in amounts of from 1.0 to 1.5 percent by weight, based on the reaction matrix consisting of acetic anhydride and cyclic siloxanes.

17. The trifluoromethanesulfonic acid-acidified, equilibrated α,ω-diacetoxypolydimethylsiloxanes according to claim 5, wherein they have an average chain length determined by $^{29}$Si-NMR spectroscopy of $10<X<20$.

18. The process according to claim 7, wherein a condensation catalyst is used for reacting the equilibrated α,ω-diacetoxypolydimethylsiloxane with polyether monools,
wherein condensation catalysts employed are acids selected from the group consisting of simple mineral acids and methanesulfonic acid, phosphoric acid, phosphonic acids and/or else acidic salt-like compounds such as triflate salts, bismuth triflate, and/or any Lewis-acidic compounds such as tin and organotin compounds, titanate esters, tetraalkoxy titanates, zinc acetylacetonate, zinc acetate, trispentafluorophenylborane and trichloroacetic acid,
wherein the condensation catalyst, in particular the trichloroacetic acid, is in the range from 0.2 to 0.5 percent by mass, based on the total amount of the reactants provided for the SiOC-bond forming reaction, namely α,ω-diacetoxypolydimethylsiloxane and polyether monool.

* * * * *